United States Patent [19]

Leidich

[11] B 3,914,684

[45] Oct. 21, 1975

[54] CURRENT PROPORTIONING CIRCUIT

[75] Inventor: Arthur John Leidich, Flemington, N.J.

[73] Assignee: RCA Corporation, New York, N.Y.

[22] Filed: Oct. 5, 1973

[21] Appl. No.: 403,990

[44] Published under the Trial Voluntary Protest Program on January 28, 1975 as document no. B 403,990.

[52] U.S. Cl. .................... 323/4; 307/32; 307/317 R; 330/22; 330/69

[51] Int. Cl.² .......................................... G05F 3/08

[58] Field of Search .......... 307/32, 296, 297, 317 R; 323/1, 4, 16, 19, 22 T; 328/160; 330/22, 23, 30 D, 69

[56] References Cited

UNITED STATES PATENTS

| | | | |
|---|---|---|---|
| 3,532,909 | 10/1970 | Buckley | 323/1 UX |
| 3,689,752 | 9/1972 | Gilbert | 328/160 X |
| 3,740,658 | 6/1973 | Loving | 330/23 |
| 3,757,137 | 9/1973 | Ahmed | 330/30 D |

*Primary Examiner*—A. D. Pellinen
*Attorney, Agent, or Firm*—H. Christoffersen; S. Cohen; A. L. Limberg

[57] ABSTRACT

A first current is applied to the joined emitter electrodes of a first and a second transistor to be split into a first and a second fractions related in the ratio $h_{fe}^n$ to 1, which fractions flow as their respective collector currents. (The common-emitter forward current gain of the first transistor is $h_{fe}$.) A first and a second paths extend from a common connection to respective base electrodes of the first and second transistors. Each path includes $n$ junction diode(s) connected in series with the base-emitter junction of the transistor to which the path connects. A second current related to the first is applied to the second path to apply additional forward bias to the $n$ diode(s) therein.

7 Claims, 4 Drawing Figures

CURRENT PROPORTIONING CIRCUIT

The present invention relates to current proportioning circuits and in particular to the type in which an output current is developed which is proportional to an input current divided by substantially the following quantity; the common emitter forward current gain, $h_{fe}$, of a transistor raised to a power.

Current proportioning circuits having these characteristics were first described in United States Patent Application Ser. No. 302,866, filed Nov. 1, 1972, in the name of A.A.A. Ahmed; entitled "Stabilization of Quiescent Collector Potential of Current-mode Biased Transistors" and assigned, like the present application, to RCA Corporation. Current proportioning circuits which provide output currents related to input currents inversely as forward common-emitter current gains of transistors are also discussed in U.S. Pat. Application Ser. No. 363,563 filed May 24, 1973 in may name; entitled "Bias Circuitry for Stacked Transistor Power Amplifier Stages" and also assigned to RCA Corporation.

The present invention is embodied in the following type of current proportioning circuit. A first current is applied to the joined electrodes of a first and a second transistors to be split into a first and a second fractions. The base electrodes of the first and the second transistors are coupled to a common point by a first and a second conductive path, respectively, each of which paths contains n serially connected semiconductor diodes or semiconductor junctions. A second current is applied to the first conductive path to increase its conductance as compared to the second conductive path. The collector current of the first transistor is thus caused to be related to the collector current of the second transistor by a factor substantially $1/h_{fe}^n$, where n is a positive integer.

Figure 1:
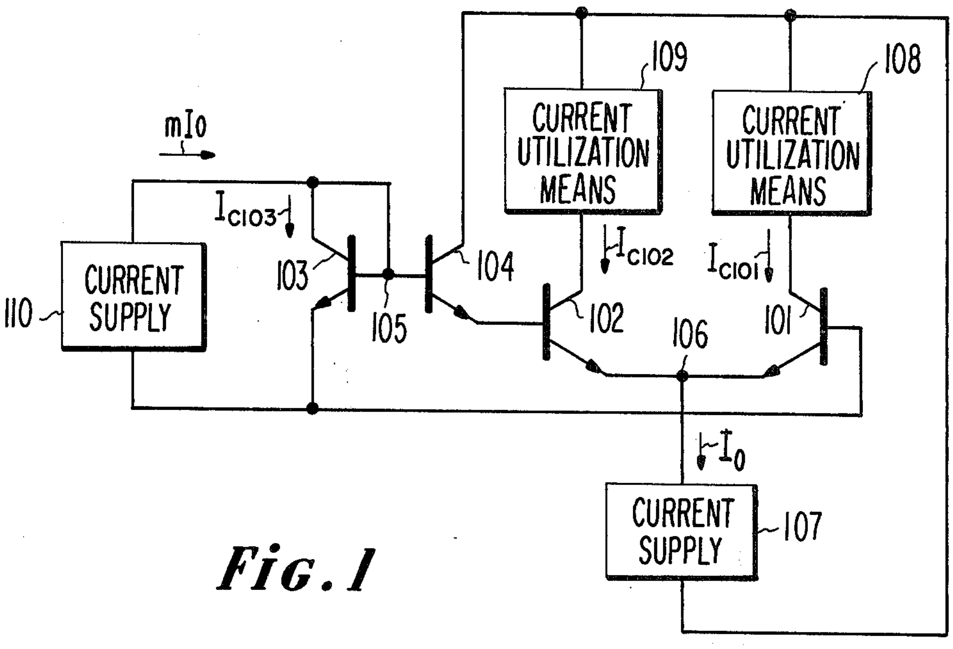
FIG. 1 is a schematic diagram, partially in block form, of a current proportioning circuit embodying the present invention to develop currents related by a factor substantially $1/h_{fe}$.

In FIG. 1, transistors 101 and 102 have their base electrodes coupled by the base emitter junctions of transistors 103 and 104, respectively, to an interconnection 105. Transistors 101 and 102 have a current $I_O$ withdrawn from the interconnection 106 of their joined emitter electrodes by a current supply 107. Transistors 101 and 102 C102collector currents $I_{C101}$ and $I_{C102}$, respectively, from supply 107 via current utilization means 108 and 109, respectively. A current supply 110 forward biases the base-emitter junction of transistor 103.

Each of the transistors 101, 102, 103 and 104 will obey the following well-known equation 1.

$$V_{BE} = kT/q \ 1n \ I_C/I_S \quad (1)$$

where:

$V_{BE}$ is the base-emitter potential of the transistor, $k$ is Boltzmann's constant, T is absolute temperature, $q$ is the charge on an electron, $I_C$ is the transistor collector current, and $I_S$ is the transistor saturation current.

Electrical quantities, when referred to a specific transistor in this specification, will have a numerical subscript corresponding to that used to identify the transistor in the drawing. Transistors 101, 102, 103 and 104 will be assumed to be transistors with the same diffusion profile, to have effective base-emitter junction areas in $a{:}b{:}c{:}d$ ratio and to be maintained at equal temperature $T$, conditions which can be closely approximated, particularly in monolithic semiconductor integrated circuitry. In such case, $T_{101} = T_{102} = T_{103} = T_{104} = T$ and $aI_{S101} = bI$ S102 $= cI_{S103} = dI_{S104}$ From FIG. 1, because of the parallel connection of the circuit comprising base-emitter junctions of transistors 101 and 103 with the circuit comprising the base-emitter junctions of transistors 102 and 104,

$$V_{BE101} + V_{BE103} = V_{BE102} + V_{BE104} \quad (2)$$

Substituting equation 1 into equation 2 and simplifying, equation 3 is obtained.

$$ln\ I_{C101}/a + ln\ I_{C103}/c\ ln\ I_{C102}/b + ln\ I_{C104}/d \quad (3)$$

In any transistor, the following relationships obtain between its base current, $I_B$, its emitter current, $I_E$; its collector current, $I_C$, and its common-emitter forward current gain, $h_{fe}$.

$$I_E = h_{fe}\ I_B = (h_{fe} + 1/h_{fe})\ I_C \quad (4)$$

$$I_B = I_C/h_{fe} \quad (5)$$

From FIG. 1,

$$I_{E104} = I_{B102} \quad (6)$$

Substituting from equations 4 and 5 into equation 6, $$(h_{fe104} + 1/h_{fe104})\ I_{C104} = (1/h_{fe102})\ I_{C102} \quad (7)$$

Substituting equation 7 into equation 3, equation 8 is obtained.

$$ln\ (I_{C101}/a) + 1n(I_{C103}/c) + 1n(I_{C102}/b) + 1n[(I/d)(h_{fe104}/h_{fe102})(I_{C102})/(h_{fe104}+1)] \quad (8)$$

rearranging the equation and taking the anti-logarithim of both sides of the equation:

$$I_{C101}/I_{C102} = ac/bd\ (h_{fe104}/h_{fe102})\ [1/(h_{fe104} + 1)]\ (I_{C102}/I_{C103}) \quad (9)$$

Over a wide range of base-emitter junction current densities $h_{fe101} = h_{fe102} = h_{fe103} = h_{fe104} = h_{fe}$ when transistors 101, 102, 103 and 104 have the same diffusion profile. If $I_{C102}$ is made to equal $mI_{C103}$, where n is an arbitrarily choosen scaling factor, equation 9 can be expressed as:

$$I_{C101}/I_{C102} = (acm/bd)\ (1/h_{fe} + 1) \quad (10)$$

Assume, however, current supply 110 supplies a current $mI_O$, which is larger than $I_{B101} + I_{B104}$ by a hundred times or more. Then:

$$mI_0 = I_{E103} = (h_{fe103} + 1/h_{fe103})\ I_{C103} \quad (11)$$

Figure 2:
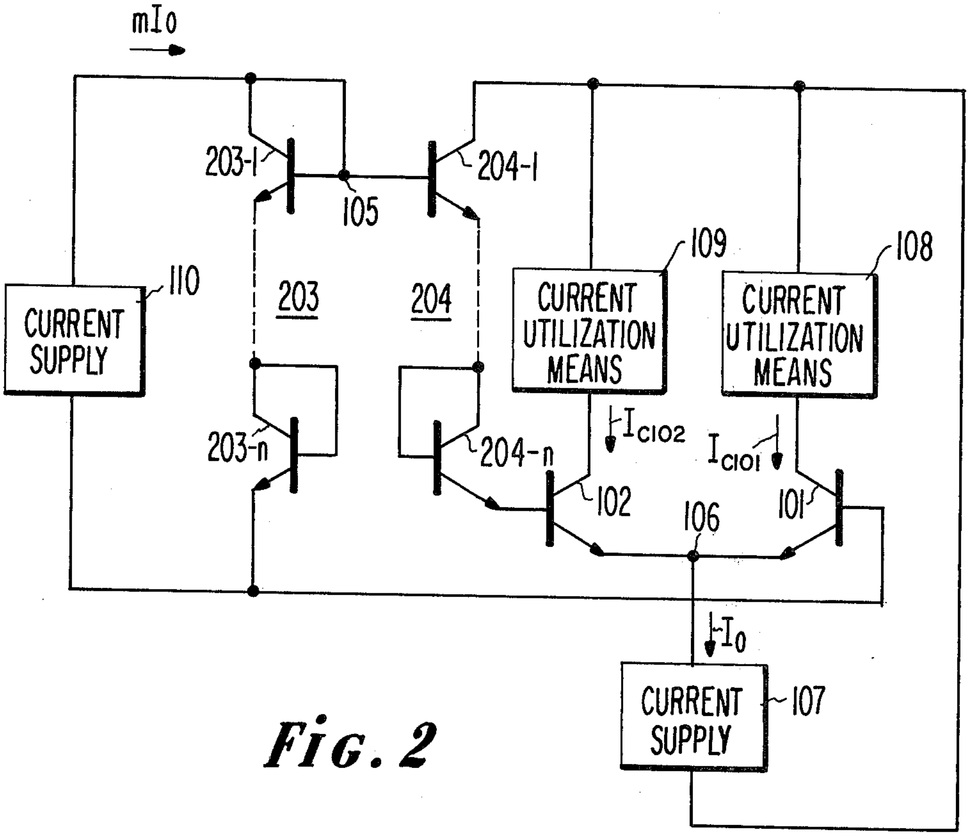
FIG. 2 is a schematic diagram partially in block form, of a current proportioning circuit embodying the present invention to develop currents related by a factor substantially $1/h_{fe}^n$, where $n$ is an integer greater than one.

FIG. 2 is a modification of the FIG. 1 circuit in which diode connected transistor 103 is replaced by a series combination 203 of *n* diode-connected transistors, the first and last of which, 203-1 and 203-*n*, respectively, are shown. Transistor 104 is replaced by a combination 204 of a single transistor 204-1 having connected in series with its base-emitter junction $n-1$ *diode-connected transistors, the last one which,* 204-*n*, is shown.

The voltages present in the circuit of FIG. 2 are related in the manner shown in equation 13 below. This equation is derived in a manner similar to that employed to obtain equation 2.

$$V_{BE101}+V_{BE203\text{-}1}+\ldots+V_{BE203\text{-}n}=V_{BE102}+V_{BE204\text{-}1}+\ldots V_{BE204\text{-}n} \quad (13)$$

Transistors 203-1, . . . 203-n are assumed to be substantially identical to each other and to the replaced transistor 103 in construction and characteristics. Transistors 204-1, . . . 204-n are assumed also to be substantially identical to each other and to the replaced transistor 103 in construction and characteristics. Accordingly, equation 13 may be simplified to the following form.

$$V_{BE101}+nV_{BE103}=V_{BE102}+nV_{BE104} \quad (14)$$

Steps analgous to those set forth in equations 3–12 yield equation 15.

$$I_{C102}/I_{C101}=a/b[cm/d(1/h_{fe})]^n \quad (15)$$

$I_{C101}$ and $I_{C102}$ can be applied to the input circuits of first and second current amplifiers, respectively, which current amplifiers have a fixed relationship between their respective current gains. The output circuits of the first and the second current amplifiers will provide output currents in $1:h_{fe}^n$ ratio which can be applied to bias the "base" and "collector" of a "transistor" as taught in the previously mentioned U.S. Pat. Application Ser. No. 302,866. When *n* exceeds 1 this "transistor" will be a composite transistor formed by a Darlington cascade of simple transistors.

Figure 3:
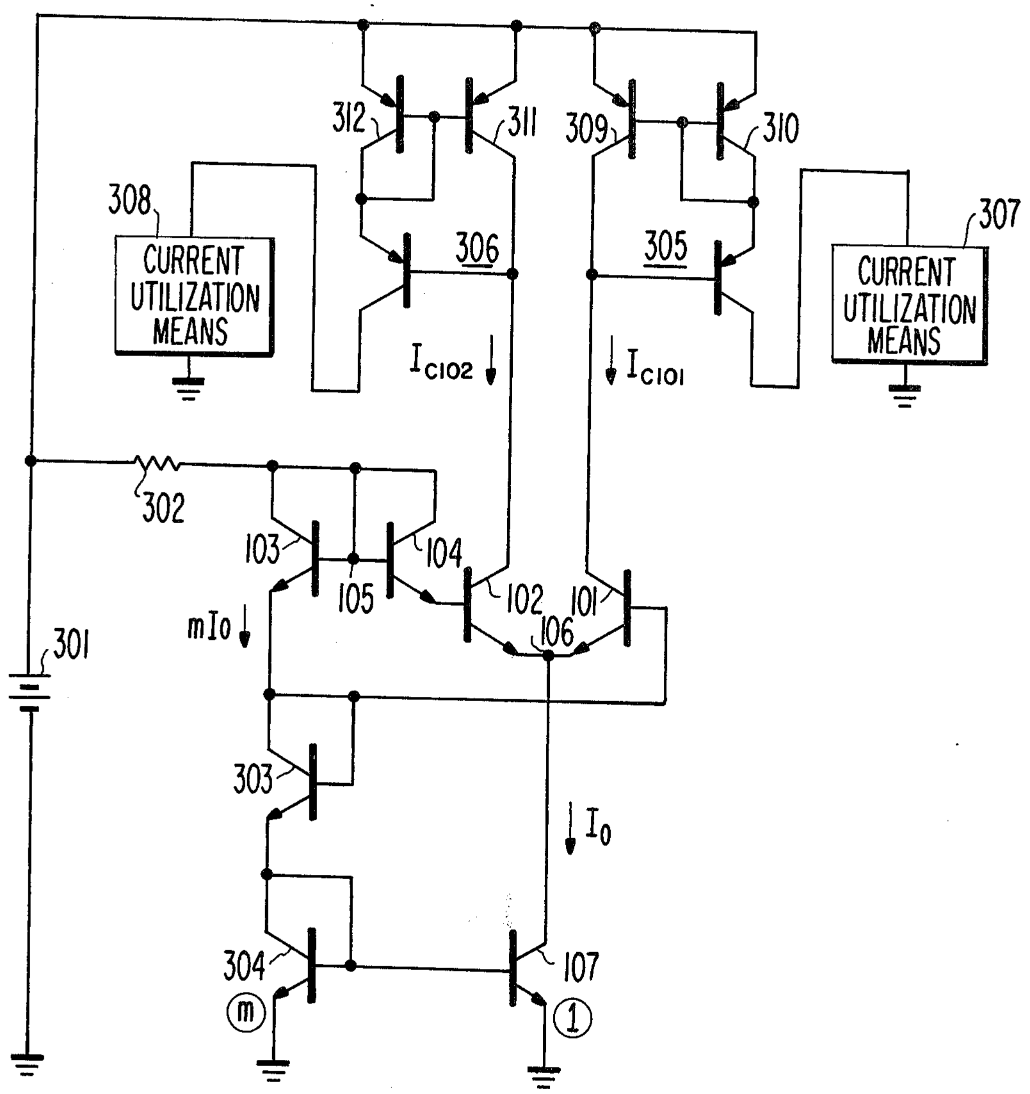
FIGS. 3 and 4 are schematic diagrams of preferred embodiments of current proportioning circuits of the type shown generally in FIG. 1.

While the collector electrode of transistor 104 was shown as being connected to receive collector current from supply 107 in the FIG. 1 configuration, transistor 104 may be connected to receive current from supply 110 instead. This alternative configuration is illustrated in FIG. 3. (Similarly, in FIG. 2, the collector current of transistor 204-1 may be connected to receive collector current from supply 110 rather than supply 107.) The proportioning of $I_{C102}$ and $I_{C101}$ is substantially unaffected by this collector electrode connection.

The FIG. 3 circuit also shows specific circuitry to provide the $mI_o$ and $I_o$ currents.

The current $mI_0$ is determined according to Ohm's Law by dividing the potential appearing across resistor 302 by its resistance $R_{302}$.

$$mI_0=(E_{301}-V_{BE103}-V_{BE303}-V_{BE304})/R_{302} \quad (16)$$

where:

$E_{301}$ is the potential provided by battery 301, $V_{BE103}$ is the base-emitter offset potential of transistor 103, $V_{BE303}$ is the base-emitter offset potential of transistor 303, and $V_{BE304}$ is the base-emitter offset potential of transistor 304.

For silicon transistors $v_{BE103}$, $V_{BE303}$ and $V_{BE304}$ will each equal about 650 millivolts. $I_0$ flows in the collector circuit of transistor 107 which has a base-emitter junction with an effective area $1/m$ times as large as that of transistor 304. The circled quantities next to the emitter electrodes of transistors 107 and 304 in FIG. 3 indicate the relative sizes of their base-emitter junctions. The collector currents, $I_{C101}$ and $I_{C102}$, of transistors 101 and 102 are withdrawn respectively from the input circuits of current amplifiers 305 and 306, respectively. Current amplifiers 305 and 306 are of a type known in the art.

The output circuits of current amplifiers 305 and 306, respectively, are supplied to current utilization means 307 and 308, respectively. An arrangement of particular interest is one in which the current gains of amplifiers 305 and 306 are alike and in which the current utilization means 307 and 308 comprise the base and collector circuits, respectively, of an amplifier transistor having a common-emitter forward current gain, $h_{fe}$, equal to that of transistor 102.

Figure 4:
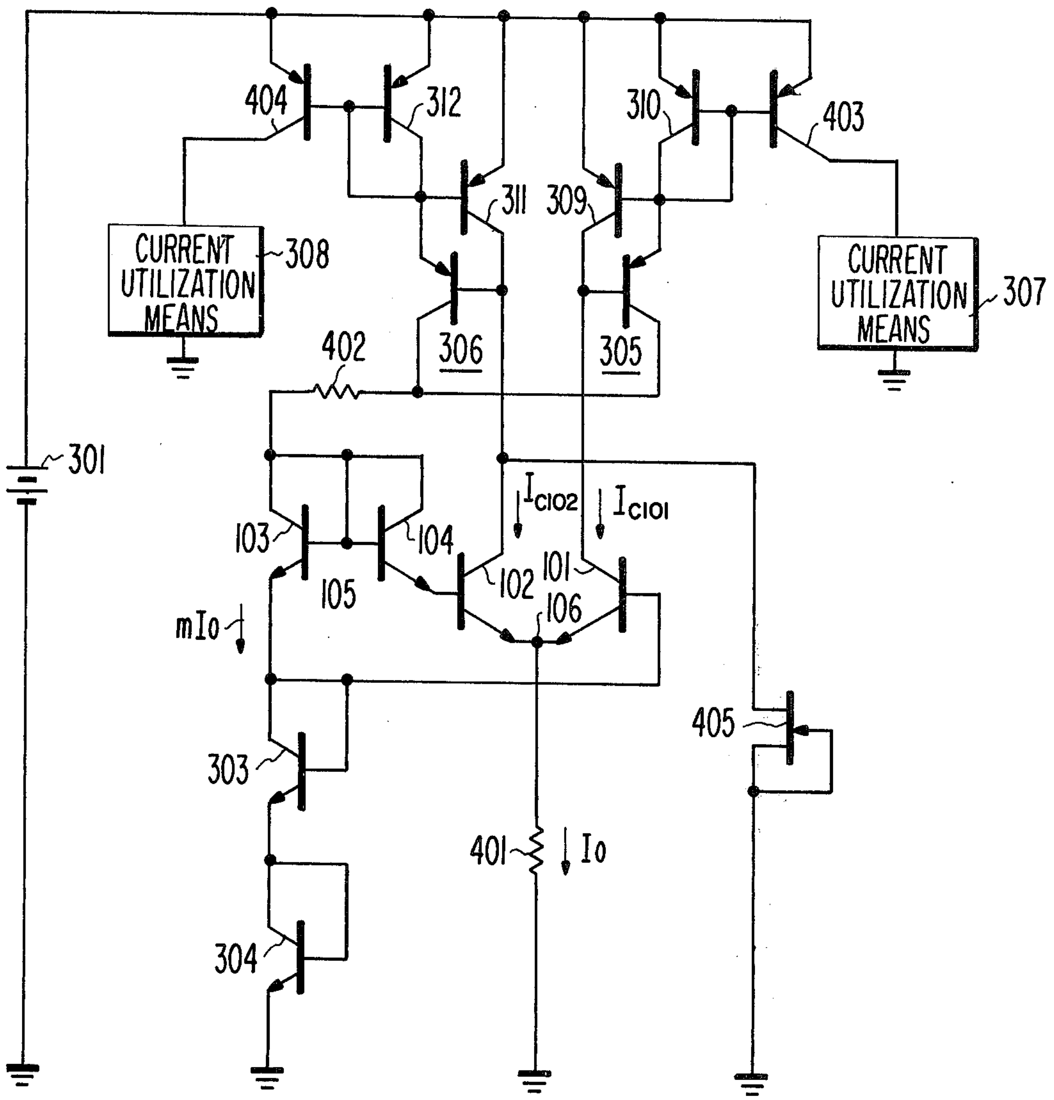

In the FIG. 4 circuit, the resistance of $R_{401}$ of a resistor 401 determined the value of $I_O$ withdrawn from interconnection 106 to which the emitter electrodes of transistors 101 and 102 are joined. Assuming diodeconnected transistors 303 and 304 to be conventionally biased by a major portion of $mI_0$, the potential $E_{106}$ appearing at terminal 106 can be seen to conform to the following equation.

$$I_0=E_{106}/R_{401}=(V_{BE304}+V_{BE303}-V_{BE101})/R_{401} \quad (17)$$

Since $V_{BE}$ is approximately 650 millivolts for a silicon device over a wide current range, to an approximation, $I_0$ equals 650 millivolts divided by $R_{401}$. The current gain, *G*, of current amplifiers 305 and 306 insofar as current supplied via resistor 402 is concerned is made substantially equal to $-m$.

The current amplifiers 305 and 306 together supply the $mI_0$ combined collector and base currents of transistor 103 and the much smaller combined collector and base currents of transistor 104.

Current utilization means 307 and 308 are supplied input currents from the collector electrodes of transistors 403 and 404, respectively. Since transistor 403 has the same base-emitter offset potential ($V_{BE}$) as transistor 309 which supplies $I_{C101}$ current from its collector electrode, the collector current $I_{C403}$ of transistor 403 will be related to $I_{C102}$. If transistors 309 and 403 are identically similar, $I_{C403}$ will equal $I_{C102}$. Alternatively, if the base-emitter junctions of transistors 309 and 403 have similar diffusion profiles but effective areas in ratio $1:G$, respectively, $I_{C403}$ will be G times as large as $I_{C101}$. By similar means, the collector current of transistor 404, $I_{C404}$, is scaled to $I_{C102}$.

The self-biased junction field effect transistor 405 provides a small current (10 to 50 microamperes) to initiate conduction in the input circuit of current amplifier 306. This causes the output circuit of current amplifier 306 to supply forward bias current to diode-connected transistors 103, 303 and 304. This is necessary to apply forward bias to the base-emitter junctions of transistors 104, 102 and 101. Such forward bias develops $E_{106}$ to cause $I_0$ to flow. Resistor 402 is included to provide limiting of the $mI_0$ current under transient conditons.

The term "semiconductor diode" in the claims may refer to any of the following: a simple PN junction, the base-emitter junction of an emitter follower transistor, or a transistor connected as a diode—for example, a transistor having joined base and collector electrodes. Simple PN junctions may replace transistor 103 and the emitter follower transistor 104 of FIG. 1; the transistors in combination 103 emitter follower transistor 204-1 and the rest of the transistors in combination 204 of FIG. 2; and the transistors 103, 104, 303 and 304 of FIGS. 3 and 4.

What is claimed is:

1. In combination:

first and second transistors, each having base and emitter electrodes with a base emitter junction therebetween and each having a collector electrode, their emitter electrodes being joined at a first interconnection;

first and second conductive paths connecting respective ones of the base electrodes of said first and said second transistors to a second interconnection;

$2n$ semiconductor diodes, n of which are included in said first conductive path without other substantial intervening elements and poled for serial forward conduction with said first transistor base-emitter junction, and n others of which are included in said second conductive path without other substantial intervening elements and poled for serial conduction with said second transistor base-emitter junction, n being a positive integer;

a first current supply coupled in circuit with said first conductive path to forward bias each semiconductor junction therein;

a second current supply; and means connecting said second current supply between said first interconnection and each of the collector electrodes of said first and said second transistors, including:

a first current utilization means in the connection of said second current supply to said first transistor collector electrode, the base current flow of said second transistor resulting from the aforesaid connections of the aforesaid elements providing the sole means to forward bias each said semiconductor junction in said second conductive path.

2. The combination set forth in claim 1 having: $2n$ further transistors, each having a base and an emitter electrodes with a semiconductor junction therebetween, each having a collector electrode to which its said base electrode is connected and each providing between its said collector and said emitter electrodes one of said 2n semiconductor diodes.

3. The combination set forth in claim 1 having:

a third and a fourth transistors, each having a base and an emitter electrodes with an emitter-base junction therebetween, each having a collector electrode, their base electrodes being connected to said second interconnection and their respective base-emitter junctions providing one of the diodes in said first and in said second conductive paths, respectively; and means connected to each of the collector electrodes of said third and said fourth transistors for biasing them for normal transistor operation.

4. The combination set forth in claim 3, wherein $n$ exceeds 1, having:

$2n-2$ further transistors each having a base and an emitter electrodes with a semiconductor junction therebetween, each having a collector electrode to which its base electrode is connector and each providing between its collector and emitter electrodes one of said $2n$ semiconductor diodes not provided by the base-emitter junctions of said third and said fourth transistors.

5. The combination set forth in claim 1 having:

first and second current amplifiers each having an input circuit and an output circuit, the input circuit of said first current amplifier having said first transistor collector electrode connected thereto, and corresponding to said first current utilization means, the input circuit of said second current amplifier connecting said second transistor collector electrode to said second current supply, the input circuit of said second transistor also being included in said means connecting said second current supply between said first interconnection and each of the collector electrodes of said first and said second transistors, as a second current utilization means.

6. The combination set forth in claim 5 wherein said first current supply comprises means for additively combining the output currents from the output circuits of said first and said second current amplifiers to which it is connected, to obtain said first current.

7. The combination of:

first and second transistors, each having base, emitter and collector electrodes, connected emitter electrode-to-emitter electrode, and a current source coupled between the emitter electrodes and the respective collector electrodes of said transistors for supplying the collector-to-emitter currents of said transistors;

a third transistor having base, emitter, and collector electrodes;

means connecting said third transistor emitter electrode to said second transistor base electrode and serving as the principal path for the base current flow of said second transistor, whereby the emitter current of said third transistor and the base current of said second transistor substantially equal each other;

means supplying a current via the emitter-to-collector path of said third transistor to the base electrode of said second transistor;

a common connection;

two paths, the first between said common connection and the base electrode of said first transistor, and the second between said common connection and the base electrode of said second transistor, said second path including at least one diode comprising the base-emitter diode of the third transistor, and said first path including the same number of diodes as said second path, said diodes being connected to conduct current in the forward direction relative to the base-emitter diodes of the first and second transistors; and means connected between said common connection and the emitter electrodes of said first and said second transistors for applying currents in the forward direction through the first and second paths, the former of which currents is larger than the latter.

* * * * *

UNITED STATES PATENT OFFICE
CERTIFICATE OF CORRECTION

PATENT NO. : 3,914,684
DATED : October 21, 1975
INVENTOR(S) : Arthur John Leidich It is certified that error appears in the above-identified patent and that said Letters Patent are hereby corrected as shown below:

Column 1, line 56, delete "C102".

Column 1, equation 1, should read
---$V_{BE} = (kT/q) \ln (I_C/I_S)$---.

Column 2, line 16, should read
---T and $aI_{S101} = bI_{S102} = cI_{S103} = dI_{S104}$---.

Column 2, equation 3, should read
---$\ln(I_{C101}/a)+\ln(I_{C103}/c)=\ln(I_{C102}/b)+\ln(I_{C104}/d)$---.

Column 2, equation 4, should read
---$I_E = h_{fe}\ I_B = (h_{fe}+1)\ I_C/h_{fe}$---.

Column 2, equation 7, should read
---$[(h_{fe104}+1)/h_{fe104}] = (1/h_{fe102})\ I_{C102}$---.

Column 2, equation 8, should read
---$\ln(I_{C101}/a)+\ln(I_{C103}/c) = \ln(I_{C102}/b)+\ln[(1/d)(h_{fe104}/h_{fe102})(I_{C102})/(h_{fe104}+1)]$ ---.

Column 2, equation 9, should read
---$I_{C101}/I_{C102} = (ac/bd)(h_{fe104}/h_{fe102})[1/(h_{fe104}+1)](I_{C102}/I_{C103})$ ---.

Column 2, line 58, should read
---profile. If $I_{C103}$ is made to equal $mI_{C102}$, where m is an ar- ---.

Column 2, equation 10, should read
---$I_{C101}/I_{C102} = (ac/bdm)(h_{fe}+1)$---

Column 2, equation 11, should read
---$mI_0 = I_{E103} = (h_{fe103}+1)\ I_{C103}/h_{fe103}$ ---.

UNITED STATES PATENT OFFICE
CERTIFICATE OF CORRECTION

PATENT NO. : 3,914,684

DATED : October 21, 1975

INVENTOR(S) : Arthur John Leidich

It is certified that error appears in the above-identified patent and that said Letters Patent are hereby corrected as shown below:

Column 3, lines 7-8, "diode-connected transistors, the last one of which" should be in standard roman letters, not italics.

Column 3, line 8, after "one" insert ---of---.

Column 3, equation 15, should read ---$I_{C101}/I_{C102} = (a/b)[c/dm(h_{fe}+1)]^n$ ---.

Column 4, lines 21 and 22, "diodeconnected" should read ---diode-connected---.

Signed and Sealed this

Thirteenth Day of July 1976

[SEAL]

*Attest:*

RUTH C. MASON
*Attesting Officer*

C. MARSHALL DANN
*Commissioner of Patents and Trademarks*